United States Patent [19]
Ferrari et al.

[11] 3,834,821
[45] Sept. 10, 1974

[54] MULTIPLE PHOTOMETER ASSEMBLY

[75] Inventors: Andres Ferrari, Dover; Leo J. Blumle, Milton; Laurence C. Bonar, Brighton, all of Mass.

[73] Assignee: Damon Corporation, Needham Heights, Mass.

[22] Filed: Jan. 12, 1971

[21] Appl. No.: 105,822

[52] U.S. Cl............... 356/181, 356/205, 356/246
[51] Int. Cl. .............................................. G01j 3/46
[58] Field of Search ........... 356/181, 186, 187, 195, 356/205, 246; 350/96; 250/227

[56] References Cited
UNITED STATES PATENTS

| | | | |
|---|---|---|---|
| 3,504,981 | 4/1970 | Malvin | 356/195 |
| 3,507,598 | 4/1970 | Malvin | 356/195 |
| 3,524,709 | 8/1970 | Hrdina | 356/246 |
| 3,551,058 | 12/1970 | Dodds et al. | 356/186 |
| 3,619,068 | 11/1971 | Broerman | 250/227 |
| 3,697,185 | 10/1972 | Kassel | 356/205 |

OTHER PUBLICATIONS
Multiple Wavelength . . . Scanning, 53 AJCP May 1970, Roberts et al.

*Primary Examiner*—Ronald L. Wibert
*Assistant Examiner*—Conrad Clark
*Attorney, Agent, or Firm*—Kenway & Jenney

[57] ABSTRACT

A novel photometer assembly which may be used in the ultra-violet region of the spectrum is disclosed. The assembly includes a single energy source and chopper assembly both of which service multiple photometer modules and therefore multiple optical paths. The photometer modules which are preferably of the double beam type including a reference and a sample beam, include fiber optical elements conducting radiation to and receiving radiation from a novel cuvette in which liquid samples may be received. The reference channel includes a cuvette with a reference fluid therein or may be simply a continuous fiber optical element. The radiation from each channel is chopped by a common chopper disk and supplied to a detector. A photometer module for differential photometry is described. Energy from the single source passes through the two channels and then is chopped at different frequencies before being recombined to fall on a single detector at a single location.

24 Claims, 5 Drawing Figures

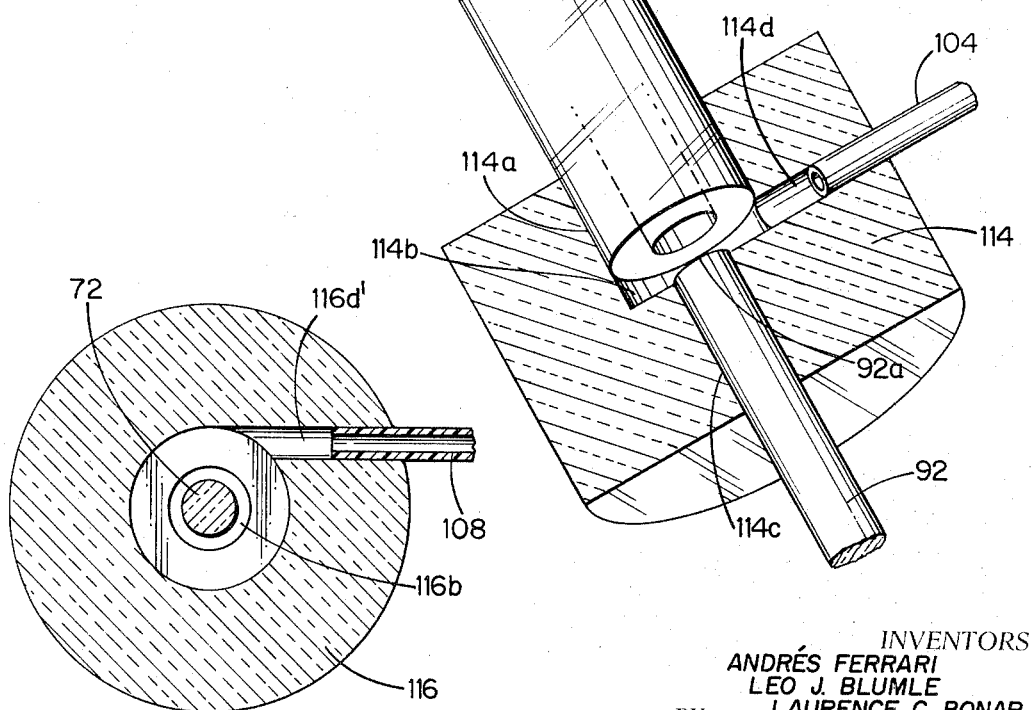

3,834,821

MULTIPLE PHOTOMETER ASSEMBLY

BACKGROUND OF THE INVENTION

1. Field of the Invention

Our invention relates to a novel photometer assembly. More particularly it relates to a photometer assembly particularly useful in detecting the results of chemical changes resulting from analysis procedures carried out by modern automatic analysis machines such as are used for example in performing a number of tests on a single blood sample.

2. Description of the Prior Art

Modern automatic analysis machines typically receive samples of a fluid to be analyzed in time sequence. For example the fluid may be the serum portion of human blood, urine or samples of water which are to be tested. These samples are divided into a number of aliquots and the aliquots are chemically treated in a corresponding number of processing paths each processing path analyzing for a particular constituent. Typically the analysis results in a color change in the aliquot. The intensity of the color change, if measured photometrically, can be used to determine the amount of the constituent present in the sample. In many situations it is desirable to make the photometric measurement differentially i.e. two aliquots are processed simultaneously but only one is supplied with the reagent producing the color change, the other being treated with a "blank" reagent. These two samples are then supplied to two flow cuvettes which are illuminated from the same source and narrow bandwidth light (which may be in the infra-red, visible or ultra-violet portion of the spectrum) is passed by the flow cuvettes, detected and converted to electrical signals. The difference between the two electrical signals is then a measure of the difference in "color" of the two samples, which in turn is a measure of the amount of the constituent analyzed for in the aliquot to which the active reagent was added.

Analysis machines such as those described are known. It is apparent that with a plurality of channels simultaneously analyzing samples, either a plurality of photometers are required or a lesser number of photometers must be time-shared between a plurality of channels. In practice it has generally been found desirable to provide a photometer associated with each processing path rather than time-sharing them. This permits a substantial increase in the number of samples which may be processed in a given time. When a plurality of photometers is provided, some elements may be commonly provided, as for example the light source. A multiple photometer assembly for t8e purposes described above is shown for example in U.S. Pat. No. 3,503,683 issued Mar. 31, 1970 to Isreeli et al.

In the multiple photometer assembly described in the cited patent, a light source is positioned at the center of the assembly, a plurality of sets of optical elements are positioned radially around the light source to define a plurality of radially extending optical axes. Flow cuvettes are positioned on these optical axes radially outwardly from the optics and finally light detectors to convert the light passed by the cuvettes into electrical signals are positioned around the outer periphery of the device.

If it is desired to "chop" i.e., periodically interrupt the transmitted light from the flow cuvettes, in this prior construction, individual choppers would be required for each optical path which would add substantially to the complexity and cost. Alternatively a relatively expensive "drum" type chopper might be used. Further, the device illustrated in the cited patent is bulky and complex and requires complex adjusting means for each individual optical path.

Accordingly, it is a principal object of our invention is to provide a novel multiple photometer assembly for the purposes described using as many common elements as possible.

It is another object of our invention to provide a multiple photometer assembly which is compact in physical size.

Another object of our invention is to provide a multiple photometer assembly which is relatively simple in construction.

Still another object of our invention is to provide a multiple photometer assembly of the type described requiring a minimum of adjustment.

A still further object of our invention is to provide a simple and economical photometer, including a differential photometer, for operation in the ultra-violet region of the spectrum.

Yet a further object of our invention is to provide an improved flow cuvette in which the sample liquid flows generally vertically upward.

Other and further objects of our invention will in part be obvious and will in part appear hereinafter.

SUMMARY OF THE INVENTION

The multiple photometer assembly of our invention includes a base plate on which an electric motor is mounted. The shaft of the motor extends through the base plate and a chopping disk having two sets of holes formed in it is secured to the motor shaft and is turned by it. The centers for each set of holes lie on concentric circles having the center of the disk as their center. The number of holes in each set is different from the number in the other set.

A photometer module mounting member is provided above the motor and supports at its top a funnel-shaped member, the funnel being positioned with its open end upward. A common light source is located at the center of the funnel member, and sets of optics are located in the side walls of the funnel. The source and the sets of optics define a plurality of optical axes extending radially outwardly and downwardly from the source. If the angle that the funnel wall makes with the vertical is $\theta$, then the angle of depression of the optical axes from the horizontal will likewise be $\theta$. A plurality of photometer modules are positioned and supported on the module mounting member. Each module includes at least one and, if differential photometry is desired, two flow cuvettes. Fiber optical elements included in each module receive the light passed along the optical axis defined by the optical element on the funnel shaped member and carry this light to the flow cuvettes. The flow cuvettes are positioned with their longitudinal axis generally vertical and fluid flow is directed upward along their longitudinal axis. Bubbles in the fluid which might interfere with optical measurement pass upward and are captered in a chamber above the location where the fiber optical element carrying the light from the source enters the fluid in the cuvette.

Light passed by the fluid is transmitted by another fiber optical element through an opening in the base plate at which point the optical axis is substantially vertical. It is chopped by one of the sets of holes in the rotating chopping disk and allowed to fall on a photodetector for conversion to an electrical signal.

The photometer module may include two flow cuvettes one of which is supplied with a reference fluid or the reference paths may be simply a fiber optical element. In any case, it is preferable that a double beam photometer be provided. The light from each path is chopped at a different frequency by one of the two sets of holes and the two signals are thereafter optically combined so that they are detected at the same location on the surface of the photo-detector. After suitable amplification this combined signal may be electrically separated and appropriately processed.

Thus it will be seen that the optical axis of light from the common source is turned as it passes through the photometer modules by the fiber optical elements until the optical axis is substantially vertical when it reaches the plane of the chopping disk. Thus, the optical axes which originally diverged in a generally radial direction are turned so that the light emerging from the modules is proceeding along substantially parallel optical paths. This permits a single simple chopper disk to chop all of the optical signals from all channels.

The physical arrangement described results in a compact multiple photometer assembly which requires no complex adjustment and is readily useful for either single channel or differential photometry.

As noted above, photometers made in accordance with our invention are useful in the visible, infra-red or ultra-violet regions of the spectrum. Fiber optical elements or "light pipes" for the ultra-violet region have not heretofore been generally available. However, one of the inventors of the present invention has also devised a fiber optical element which may be used as a "light pipe" to transmit both visible and ultra-violet radiation. Thus the devices of our invention are useful over a wide spectral range.

The multiple photometer assembly of our invention is particularly adapted for use with the automatic analysis apparatus disclosed in the commonly assigned copending U.S. Pat. application of David I. Kosowsky, Andres Ferrari and Carl R. Hurtig entitled "Constituents-Measuring Chemical Analyzer Having Multiple Concurrently-Operated Aliquot-Processing Conveyors," Ser. No. 105,805 filed of even dae herewith, now abandoned; a continuation-in-part of which issued Oct. 9, 1973 as U.S. Pat. No. 3,764,268. In particular the manner in which the liquid samples are supplied to the flow cuvettes and are held stationary therein during measurement is described in that application.

DESCRIPTION OF DRAWINGS

A better understanding of the multiple photometer assembly of our invention will be obtained from the following Specific Description taken in conjunction with the accompanying drawings in which:

FIG. 3 is a perspective view, partially broken away of a flow cuvette made in accordance with our invention;

FIG. 4 is a cross-section taken on the plane indicated by the line 4—4 of FIG. 3; and FIG. 5 is a view similar to FIG. 4 showing an alternate and preferred location of the fluid flow inlet and outlet passages in the flow cuvette.

SPECIFIC DESCRIPTION

Figure 1:
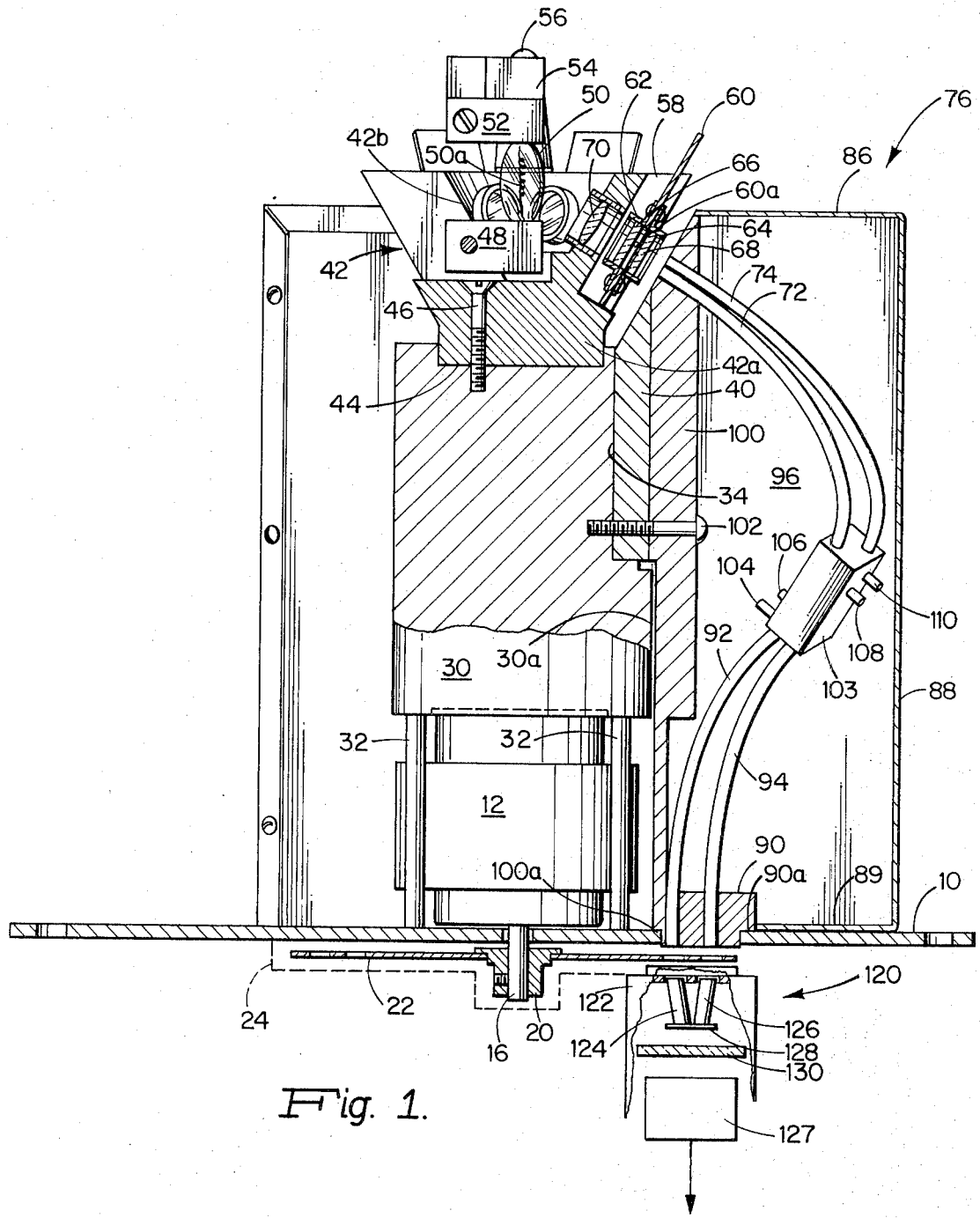
FIG. 1 is a vertical cross-section of the multiple photometer assembly taken along the plane indicated by the line 1—1 of FIG. 2.
Figure 2:
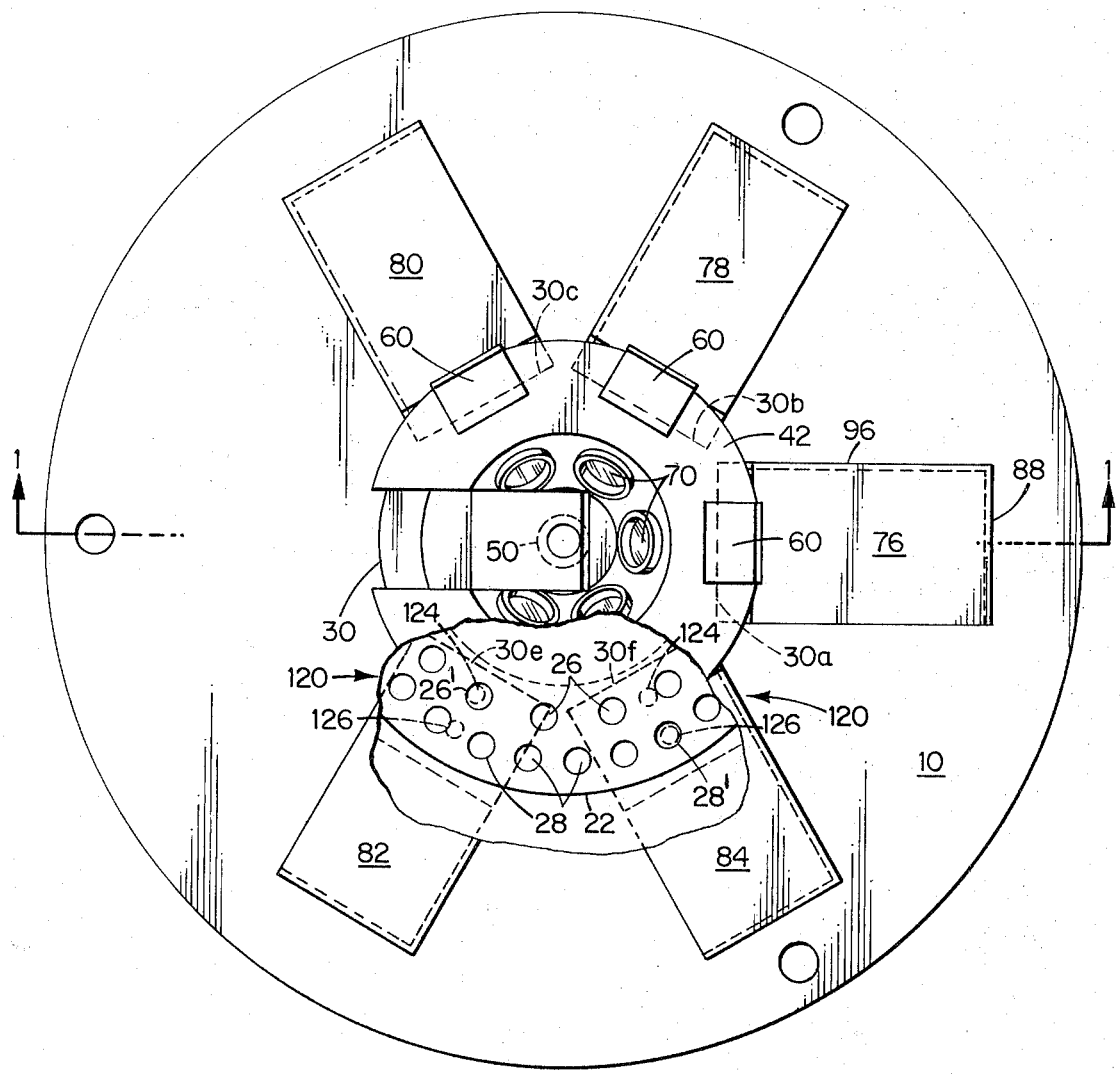
FIG. 2 is a top plan view with portions broken away of the photometer assembly of FIG. 1.

As shown in FIGS. 1 and 2 the multiple photometer assembly of our invention includes a base plate 10 on which a motor 12 (best seen in FIG. 1) is supported.

The motor shaft 16 extends through an opening provided in the base plate to its underside. A collar 20 secures to the motor shaft a chopper disk 22. A housing is provided for the chopper disk 22 and the collar 20 and is shown schematically in FIG. 1 at 24.

The chopper disk 22 is, (as seen below the broken away portion of the base plate 10 in FIG. 2), a thin circular disk having two sets of holes 26 and 28 therethrough. The centers for the holes lie on two circles concentric with the center of the disk, the centers of the set of holes 26 lying on a circle of lesser radius than that of the holes 28. It will also be observed that the number of holes in each set is different, the number in the set 26 being substantially less than the number in set 28. In an actual device made according to our invention the set 26 had 13 holes spaced about the entire chopping disk 22 while the set 28 had 23 holes around the entire disk. The purpose of the holes will be hereinafter explained.

Referring again to FIG. 1, a module mounting member 30 is supported above the motor 12 as by posts 32 through which suitable fastening members (not shown) may pass. The module mounting member 30 is shown as being a solid metal block. In practice it may be a hollow structure if desired provided it provides the required mounting functions to be hereinafter described. As seen in FIG. 2, the mounting member is circular in cross-section. It is machined to provide the vertical faces 30a, 30b and 30c. The location of additional faces 30e and 30f are indicated with phantom lines because they do not show in FIG. 2.

Each face which is to be used for module mounting has a rectangular keyway milled therein. The keyways are rectangular in cross-section, but their longest dimension is substantially less than the width of the faces of the mounting member 30. The keyways extend slightly over half way down the faces of the mounting member and are adapted to receive therein corresponding key members 40 formed on the photometer modules to be hereinafter described.

An optics support member 42 is mounted in a counterbore 44 formed on the top face of the module mounting member 30 as seen in FIG. 1. The member 42 includes a solid stem portion 42a generally having the shape of a right cylinder; a funnel shaped portion 42b integral with the stem is provided to support optical components as will be hereinafter described. The member 42 is secured to the top of member 30 by machine screws 46 or other suitable fastenings. The base and one side of the funnel member is machined to receive the bottom contact 48 for the lamp 50. Lamp 50 is a type that has connections on either end and upper and lower contact members 48 and 52 are provided. The contact member 52 is suported from the metal block 54 which in turn is supported on the insulated bushing 56 at one end thereof. The bushing 56 is in turn supported on one edge of the funnel member 42b. The lamp 50 is a conventional quartz iodide type and includes a tungsten filament 50a and a quartz envelope.

At each location around the funnel member where a module is to be mounted, a slot is milled into the slanting side wall. The slot associated with the module extending directly to the right in FIG. 2 is identified as 58 in FIG. 1. As shown in FIG. 1, a mounting plate 60 is located in each slot and extends outwardly parallel to the funnel wall. A hole 60a is provided in the plate 60 for the optical path leading from the interior of the funnel member 42a to the modules to be described. Filter holders 62 and 64 are mounted on the plate 60 and support therein filters 66 and 68 respectively. The filter 66 is typically a heat and infra-red absorbing filter; the filter 68 may be an interference filter to block all but a selected wavelength. A condensing lens 70, whose position is preferably adjustable is mounted in an opening in the reduced thickness portion of the side wall of the member 42b immediately adjacent the slot 58. The lens 70 functions to focus the energy from the lamp 50 and passed by the filter 68 on the flat polished ends of the fiber optical elements 72 and 74 in the module mounted against the face of member 30 with which slot 58 is associated.

The five optical modules 76, 78, 80, 82 and 84 are all substantially alike and will not be described individually. Rather only the module 76 which is illustrative of the module construction will be described. The module is a rectangular box formed of sheet metal or the like having an open side. The top is formed by the plate 86 and the outer wall by the plate 88. The bottom is closed by the plate 89 and by the block 90 in which the lower ends of the fiber optical elements 92 and 94 are secured. One side plate 96 is provided on which to mount the components in the module. The inner edge of the module 76 is closed by the roughly L-shaped member 100, the block 90 forming the horizontal portion of the L. As previously mentioned, the key 40 is secured to the member 100. The module 76 is secured to the member 30 in any convenient manner. For example a machine screw 102 may be used.

It will be noted that an opening is provided in the base plate 10 below the module, and the block 90 is recessed as at 90a and the vertical member 100 at 100a to receive therein the edge of the base plate. Thus the lower faces of the fiber optical elements 92 and 94 are in substantially the same plane as the bottom of the base plate 10. That is, the openings in the base plate 10 are coplanar. The plane of these openings will be seen to be longitudinal to the radial direction in which the mounting surfaces 30a, 30b . . . 30f face.

The module 76 as illustrated is useful for differential photometry of two liquid samples. The optical path of the module 76 includes two fiber optical elements 72 and 74. The upper ends of these elements are secured in holes passing angularly through the upper portion of the member 100. The ends of fiber optical elements are typically ground and polished to be optically flat. The plane defined by these faces, it will be observed, lies in a plane at right angles to the optical axis of the system defined by the filament 50a of lamp 50 and the lens 70 and filters 66 and 68. The fiber optical elements lead to a pair of flow cuvettes, one of which will be described below in connection with FIG. 3. The two cuvettes are conventionally housed or "potted" in a single unit 103 so that only their liquid inlet connections 104 and 106 and their outlet connects 108 and 110 are shown. Actual liquid tubing leading to the liquid connections shown has been omitted from the drawing for the sake of clarity, but it will be readily understood that such connections can be made to the two cuvettes in unit 103. The cuvette unit is secured to the side plate 96 in any convenient manner as by cementing it thereto.

Both cuvettes are identical; a single cuvette will now be described in connection with FIG. 3. With reference to FIG. 1, this cuvette is associated with fiber optical elements 72 and 92, liquid inlet 104 and liquid outlet 108. As shown the cuvette includes a hollow glass tube 112. In one embodiment of our invention this tube had an inner diameter of 2.2 millimeters and, an outer diameter of 4.0 millimeters and a length of about 48 millimeters. Thus the total volume included in the tube is approximately 180 microliters. Two circular end caps are provided for the tube; the inlet end cap is identified as 114 and the outlet end cap as 116. Each end cap is counterbored to provide an opening to receive and closely fit the respective ends of the tube 112. Thus, end cap 114 is provided with counter-bore 114a and cap 116 with bore 116a. It will be observed that the counterbore 116a is substantially deeper than counterbore 114a for reasons which will be explained. The ends of the tube are received in and cemented to the respective end caps with the ends of the tubes spaced from the ends of the counterbores. Thus a relatively small inlet chamber 114b is provided and a somewhat larger outlet chamber 116b.

Radiant energy from the lamp 50 is supplied to the sample from the flat end 72a of fiber optical element 72 which passes through the hole 116c formed in the end wall of the cap 116. As shown, the end of the fiber optical element enters the chamber 116b a substantial distance but does not touch the upper end of the tube 112. Radiant energy passed by the liquid in the cuvette falls on the face 92a of fiber optical element 92 and is carried by the element 92 to the detector as will be described below. The upper end of the element is secured in the hole 114c formed in the end cap 114. Again, from FIG. 3 it is apparent that the face 92a of the element 92 enters the inlet chamber 114b but does not touch the end of the tube 112.

As shown in FIGS. 3 and 4 radial liquid inlet and outlet passages 114d and 116d are provided in the respective end caps. Liquid connection tubes 104 and 108 are secured in the passages 114d and 116d respectively as illustrated.

While the cuvette is illustrated in FIGS. 3 and 4 with radially extending liquid inlet and outlet passages, in some applications passages which are tangential to the side walls of the inlet and outlet chamber 114b and 116b are desirable. Such a construction is illustrated in FIG. 5 for the end cap 116. As there shown, the passage 116d' formed in the end cap 116 has an axis which is substantially tangential to the side walls of the chamber 116b. The end cap 114 may be similarly constructed with a tangential inlet passage. The tangential passages tend to cause vortex flow in the chambers 114b and 116b and aid in the removal of bubbles which, if present, tend to interfere with optical measurement.

The end caps 114 and 116 may be made of any convenient material including Lucite (E. I. duPont deNemours' trademark for acrylic resins), tetrafluoroethylene or trifluoromonochloroethylene. In one embodiment of our invention the end caps were Lucite of approximately one half inch diameter and about three-fourths inch in length.

The cuvette illustrated in FIG. 3 may be used either with a continuously flowing stream or with a sample which is stationary therein. It is particularly useful in connection with photometry of a sample whose volume is substantially greater than the combined volume of the tube and the chambers 114b and 116 in which the sample is stopped while flowing through the cuvette, a measurement made, and is then allowed to flow again. It will be observed that the larger outlet chamber 116b is positioned at the top of the cuvette. This chamber permits any bubbles in the stopped liquid in the tube to rise into the chamber 116b where they will not interfere with the optical measurement. In this connection it will be noted that the outlet passage 116d is below the top of chamber 116b so that there is space above the liquid level to receive gas bubbles. It will also be noted that the lower end of the fiber-optical element 72 is well below the level of the outlet passage 116d so that bubbles in the top of the chamber 116b are not in the optical path. The swirling motion in the chambers 116b and 114b resulting from the tangential inlet and outlet passages such as illustrated in FIG. 5 tends to prevent bubbles in the sample liquid from stopping in the space between the ends of the tube 112 and the ends of the fiber optical elements 72 and 92.

Referring again to FIGS. 1 and 2, a radiant energy detection unit is generally indicated at 120. A detection unit of the type to be described is provided for each module. The detection unit is housed in a light tight housing, schematically shown at 122 with openings at the top thereof to admit radiant energy to a pair of fiber optical elements 124 and 126. As shown the upper ends of these elements are positioned immediately below the ends of the elements 92 and 94. Also, the vertical line from the center of the lower face of element 92 to the center of the upper face of element 124 passes through one of the set of holes 26 of the chopper disk. This is best seen in FIG. 2.

The elements 124 and 126 are inclined inwardly as shown in FIG. 1. Their inclination is such that if they were not cut off, the two lower end faces would cover substantially the same portion of the surface of the vacuum phototube detector 127. However, they are in face truncated, as shown. They are supported for example by a plate shown schematically at 128. A filter 130 may be provided to limit the spectrum of radiant energy falling on the detector 127. The detector 127 converts light energy falling thereon to an electrical signal.

As so far described, the photometer of our invention could be used for measurements of optical density using visible light from the lamp 50. We have also found that the unit described may be used for ultra-violet photometry if ultra-violet fiber optical elements are used for the elements 72, 74, 92 and 94. Because these elements are curved, simple quartz rods cannot be used. Quartz rods clad by shrinking expanded tetrafluoroethylene tubing around them provide high quality fiber optical elements useful in our device. Such elements and their method of manufacture are described in the commonly assigned co-pending U.S. application of Laurence C. Bonar, one of the present inventors, entitled "Ultraviolet Light Conductor," Ser. No. 105,802 which was filed on the same date as the present application, now abandoned. With such elements and using filters of the type which pass only ultra-violet for the filters 68 and 130 and a quartz iodide lamp such as lamp 50 to provide a source of ultra-violet energy, the photometer will function as an efficient ultra-violet photometer. Of course, by merely changing filters, it will also serve as a photometer in the visible spectrum.

The operation of the photometer of our invention will now be described with respect to the differential photometer channel shown in FIG. 1. It is of course to be understood that a single channel would operate in substantially the same fashion.

Radiant energy from the bulb 50 is focused by the lenses 70 arranged around it on the optically flat ends of the fiber optical elements 72 and 74 in each module. These elements conduct the energy to the two flow cuvettes, constructed as described in FIG. 3, enclosed in the housing 103. The liquid sample to be measured is introduced into one cuvette through one inlet connection, as for example connection 106 and flows upward through the cuvette, leaving the cuvette through outlet connection 110. A reference liquid against which the sample is to be measured is introduced to inlet 104 and also flows upward through the cuvette illustrated in FIG. 3 and leaves the cuvette through outlet connection 108. Preferably, although not necessarily, the liquid streams are stopped in the respective cuvettes at the time the measurement is made as described in greater detail in the Kosowsky et al U.S. Pat. application heretofore cited.

The radiant energy entering the cuvettes through the lower ends of the elements 72 and 74 which are actually immersed in the liquids therein traverse the liquid and the transmitted light impinges on the upper ends of the fiber optical elements 92 and 94. The difference in intensity of the energy impinging on the upper ends of the elements 92 and 94 is representative of the difference in transmission of the sample and reference liquids at the wavelength of the radiant energy. The transmitted energy is conducted by the elements 92 and 94 to the bottom of the base plate 10. In order to reach the elements 124 and 126, the energy must pass through the chopping disk 22 which is being rotated by the motor 12. Energy from the reference cuvette, passing through the element 92 is chopped by the set of holes 26 in the disk 22. Energy from the sample cell is chopped by the holes 28 in disk 22. In the embodiment of our device described, the motor rotated at 30 revolutions per second. Thus the light transmitted through the path including the reference liquid was chopped or modulated at a rate of $13 \times 30 = 390$ hertz. The sample path was similarly chopped at a rate of $23 \times 30 = 690$ hertz.

The energy from both the sample and the reference paths after chopping is conducted to the same area of the detector tube 127 to avoid differences in the two signals resulting from variation in sensitivity across the detector surface. The electrical signal produced by the detector 127 is then a composite of the reference path signal modulated at 390 hertz and the sample path signal modulated at 690 hertz. The composite signal may be processed and, after processing may be electrically separated into a reference and a sample signal. One embodiment of apparatus useful in processing signals from differential photometers of our design is disclosed in the commonly assigned copending U.S. application of R. Badessa entitled "Log Ratio Signal Processor," Ser. No. 105,802, which was filed on the same date as the present application and which issued on May 15, 1973 as U.S. Pat. No. 3,733,137. It is of course to be understood that the foregoing frequencies are for illustrative purposes only and other frequencies could be chosen. It is desirable however that the selected frequencies neither be harmonically related nor harmonically related to conventional power frequencies such as 50 or 60 hertz.

It will of course be understood that where we have used the expression "light" herein and in the claims it is to be taken where the context permits, as including the visible, ultra-violet and infra-red portions of the spectrum. Further, while we have described the multiple photometer assembly of our invention in its normal orientation, it is to be understood that, except for the flow cuvette, the unit is substantially insensitive to orientation. Further, if the unit were inverted, the flow cuvettes could be readily inverted from the orientation illustrated and described.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, we claim:

1. A multiple photometer assembly for the concurrent and independent measurement of plural liquid samples, said photometer comprising, in combination, a light source, a plurality of lenses, means supporting said lenses circumferentially surrounding said light source for simultaneous illumination, said source and said lenses defining a like plurality of optical axes radially extending from said source, a like plurality of liquid sample-receiving cuvette units, at least a first cuvette unit having first and second cuvettes, a first fiber optical element associated with each cuvette unit for receiving light traveling along one of said optical axes and transmitting it to said cuvette unit, said first fiber optical element associated with said first cuvette unit transmitting light from said source to both said cuvettes thereof, a second fiber optical element associated with each cuvette unit for receiving light passing through said cuvette unit and transmitting said received light along an optical axis substantially parallel to the optical axis by the correponding fiber optical elements of the other cuvette units whereby the light transmitted by said second fiber optical elements proceeds along substantially parallel optical axes, said second fiber optical element associated with said first cuvette unit transmitting light from both said cuvettes thereof, a photoelectric detector associated with each said second fiber optical element to receive the light transmitted by said associated element, and a single rotatable chopping disk interposed between said second fiber optical elements and said detectors, said chopping disk having two sets of openings therein which periodically interrupt at different frequencies light falling thereon, the light from said first cuvette being interrupted by one of said sets of openings and the light from said second cuvette being interrupted by the other of said sets of openings.

2. The combination defined in claim 1 which includes means for combining the light chopped by said two sets of openings into a single light beam before said light strikes said detector.

3. The combination defined in claim 1 in which said optical elements include filtering means to limit radiation falling on the first end of said first fiber optical element to ultra-violet radiation.

4. The combination defined in claim 1 in which said fiber optical elements each comprise an elongated core formed of high grade quartz rod with a cladding of tetrafluorethylene tubing.

5. The combination defined in claim 1
   in which each of said first and second cuvettes comprises an elongated tubular member, end caps secured to each end of said tubular member, each of said end caps including therein a counterbore for receiving the end of said tubular member, said tubular member extending only part way into said counter-bores, a liquid conduit extending into the portion of said counterbore in each cap not occupied by the end of said tubular member, and
   in which each of said first and second fiber optical elements associated with said first cuvette unit extends into the portion of one counterbore not occupied by said tubing.

6. The combination defined in claim 5 in which said fiber optical elements associated with said first unit have flat ends, and said ends are positioned in planes lying perpendicular to the longitudinal axis of said tube.

7. The combination defined in claim 5 in which said liquid conduit extends radially outward from said counterbore.

8. The combination defined in claim 5 in which said counterbores are circular in cross-section and said liquid conduit extnds outwardly on a tangent to the side walls of said counterbore in at least one of said caps.

9. The combination defined in claim 5 in which the fiber optical element in the outlet end cap extends into said counterbore a sufficient distance to dispose its end face closer to the end of said tubular member than is the entrance to said liquid conduit.

10. Multiple and concurrent photometer apparatus comprising in combination
   a base plate having a set of coplanar optical openings for passing therethrough optical energy directed transversely to said openings,
   an optical detector system having separate photodetector means associated with each said opening and disposed to receive optical energy passing through that opening,
   a module mounting member supported on said base plate on the side thereof opposite to said detector system, and having a plurality of mounting surfaces, each of which faces in a different radial direction extending longitudinal to the plane of said base plate openings,
   optical source means mounted on said mounting member for radiating optical energy simultaneously in all said radial directions,
   a plurality of photometer modules, each of which includes at least one liquid sample cuvette and includes fiber optical elements for carrying optical energy to said cuvette from said source means and for carrying to said detector system optical energy of said source means which passes through said cuvette, and means for attaching each of said modules against a mounting surface, said fiber optical elements in said attached modules being arranged for turning said radially-directed optical energy of said source means to progress along substantially parallel paths oriented transverse to and in optical alignment with said openings in said base plate.

11. The combination defined in claim 10 in which each of said mounting surfaces includes a keyway and each of said photometer modules includes a support member having a keyway mating key for positioning that module with respect to said support member.

12. The combination defined in claim 10 further comprising a single chopping disk disposed in the optical paths between said fiber optical elements and said detector system for chopping the optical energy from said cuvettes, and means for rotating said chopping disk relative to said mounting member and to said base plate.

13. The combination defined in claim 10 in which at least one module has two liquid sample cuvettes therein, further comprising a single chopping disk to chop optical energy from the cuvettes in all said modules and disposed in the optical paths between said fiber optical elements and said detector system, said chopping disk having two sets of optical openings therethrough with the openings of one set being different in number, and being spaced radially, from the openings of the other set, and in which each said module having two cuvettes includes fiber optical elements for directing optical energy transmitted through one cuvette to be chopped by one of said sets of openings and includes fiber optical elements for directing optical energy transmitted through the other cuvette to be chopped by the other of said sets of openings.

14. The combination defined in claim 13 further comprising means for combining the two chopped and spatially separated optical beams, from a module having two cuvettes, into a single optical beam before said separate beams strike the associated photodetector means.

15. The combination defined in claim 14 in which said optical beam combining means includes a pair of fiber optical combining elements inclined inwardly toward each other to cause said beams to converge, said combining elements being located between said chopping disk and said photodetector.

16. The combination defined in claim 14 in which said combining means includes a pair of mutually inclined fiber optical elements for combining said light beams.

17. A multiple photometer assembly comprising, in combination:

a base plate, an electric motor having a shaft and mounted on said base plate, a light chopping disk driven by said motor shaft, the plane of said disk being substantially parallel to said plate, a module mounting member having a plurality of mounting faces aligned transversely to said plane of said plate and supported on said base plate, a source of radiant optical energy mounted on said module mounting member, a plurality of lenses mounted circumferentially around said radiant energy source, one lens being provided for each mounting face on said module mounting member, said source and said lenses defining a plurality of optical axes extending radially outwardly from said source for continuous illumination therealong, a plurality of photometer modules, each of said modules including a liquid sample cuvette, and fiber optical elements to carry radiant energy to said cuvette from said radiant energy source and to carry radiant energy passing through said cuvette to a detector system, a plurality of openings in said base plate to permit energy from said cuvettes to pass therethrough, means locating and securing said plurality of modules to the mounting faces of said module mounting member.

each module being positioned above at least one opening in said base plate, the fiber optical elements in said positioned modules turning radiant energy traveling along said radially extending optical axes so that energy from said source after transversing said cuvettes, passes through said openings in a direction substantially normal to said base plate, whereby radiant energy from each cuvette is chopped by said chopping disk, and a detector system having a plurality of detectors located below said chopping disk, one of said detectors being positioned to intercept the chopped radiation from each of said modules.

18. The combination defined in claim 17 in which at least one of said modules includes two cuvettes for differential photometry and includes associated fiber optical elements to define two substantially identical optical paths, and in which said chopping disk includes two sets of openings formed therein for interrupting light falling thereon at two different frequencies, the light from a first of said cuvettes being interrupted by one of said sets of openings and the light from the other of said cuvettes being interrupted by the other of said sets of openings.

19. The combination defined in claim 18 which includes means for combining the light chopped by said two sets of openings into a single light beam before said light strikes the detector associated with said module.

20. The combination defined in claim 19 in which said light beams are combined by a pair of fiber optical elements positioned to receive light passed by said chopper disk and transmit it in a direction such that the optical axes of said elements intersect at the photosensitive surface of said photoelectric detector.

21. The combination defined in claim 13 in which said source of radiant optical energy has an emission spectrum that includes energy in the ultraviolet range, said fiber optical elements carrying radiant energy to said cuvette from said radiant energy source are designated first fiber optical elements, and said fiber optical elements carrying radiant energy passing through said cuvette to a detector system are designated second fiber optical elements.

22. The combination defined in claim 21 in which said cuvette comprises an elongated tubular member having a liquid inlet end and a liquid outlet end, a cap for said inlet end, said cap being bored to receive one said first fiber optical element, said bore being coaxial with the longitudinal axis of said tube when said cap is in place, said bore being counterbored to receive the inlet end of said tube, means securing said tube in said counterbore with its end spaced from the end of said counterbore to form an inlet chamber between the inlet end of said tube and the bottom of said counterbore, said first fiber optical element extending into said bore with its end face in the inlet chamber, its end face being normal to the longitudinal axis of said tube and a fluid inlet conduit formed in said end cap leading from the outer surface of said cap to said inlet chamber, a cap for said outlet end, said cap being bored to receive one said second fiber optical element therein, said bore being coaxial with the longitudinal axis of said tube when said cap is in place, said outlet cap being counterbored to receive the outlet end of said tube, means securing the outlet end of said tube in the counterbore in said outlet cap with the end of the tube spaced from the bottom of said countrebore thereby forming an outlet chamber between the bottom of the counterbore and the outlet end of said tube, means forming a liquid outlet conduit leading from said outlet chamber to at least the outer surface of said cap, said second fiber optical element extending into the bore formed in said outlet cap, the end face of said second fiber optical element lying in a plane normal to the longitudinal axis of said tube, the plane of the end face lying between the end of said tube and the entrance to said outlet conduit.

23. The combination defined in claim 22 in which said liquid inlet and outlet conduits extend radially outward through said cap from said inlet and outlet chambers.

24. The combination defined in claim 22 in which the longitudinal axes of said inlet and outlet conduits are substantially tangential to the side walls of said inlet and outlet chambers.

* * * * *

UNITED STATES PATENT AND TRADEMARK OFFICE
CERTIFICATE OF CORRECTION

PATENT NO. : 3,834,821
DATED : September 10, 1974
INVENTOR(S) : Andres Ferrari; Leo J. Blumle; and Laurence C. Bonar It is certified that error appears in the above-identified patent and that said Letters Patent are hereby corrected as shown below:

In the Abstract, Lines 8 and 9, change "rediation" to --radiation--.

Column 1, line 52, change "t8e" to --the--.

Column 3, line 46, change "dae" to --date--.

Column 7, line 45, change "face" to --fact--.

Column 7, line 65, change "105,802" to --105,801--.

Column 10, line 39, change "extnds" to --extends--.

Column 12, line 63, change "defined in claim 13" to --defined in claim 17--.

*Signed and Sealed this*

*eighteenth* Day of *November 1975*

[SEAL]

Attest:

RUTH C. MASON
*Attesting Officer*

C. MARSHALL DANN
*Commissioner of Patents and Trademarks*